US012651587B2

(12) United States Patent
Miller et al.

(10) Patent No.: US 12,651,587 B2
(45) Date of Patent: Jun. 9, 2026

(54) EAR-WORN HEARING DEVICE WITH ACTIVE OCCLUSION REDUCTION

(71) Applicant: KNOWLES ELECTRONICS, LLC, Itasca, IL (US)

(72) Inventors: Thomas Miller, Arlington Heights, IL (US); Charles King, Oak Park, IL (US)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 337 days.

(21) Appl. No.: 18/310,193

(22) Filed: May 1, 2023

(65) Prior Publication Data

US 2024/0371351 A1 Nov. 7, 2024

(51) Int. Cl.
*G10K 11/178* (2006.01)
*H04R 1/10* (2026.01)

(52) U.S. Cl.
CPC .. *G10K 11/17823* (2018.01); *G10K 11/17825* (2018.01); *G10K 11/17881* (2018.01); *H04R 1/1083* (2013.01); *G10K 2210/1081* (2013.01); *G10K 2210/3026* (2013.01); *G10K 2210/3027* (2013.01); *G10K 2210/3028* (2013.01); *G10K 2210/3044* (2013.01); *H04R 2460/01* (2013.01); *H04R 2460/13* (2013.01)

(58) Field of Classification Search
CPC ....... G10K 11/17823; G10K 11/17825; G10K 11/17881; G10K 2210/1081; G10K 2210/3026; G10K 2210/3027; G10K 2210/3028; G10K 2210/3044; G10K 11/17861; G10K 11/17854; H04R 1/1083; H04R 2460/01; H04R 2460/13; H04R 2225/023; H04R 2225/025; H04R 2460/05; H04R 1/1041; H04R 3/04; H04R 1/1016; H04R 25/00; H04R 25/50; H04R 2225/43; H04R 2460/09; H04R 25/552; H04R 25/48
See application file for complete search history.

(56) References Cited

U.S. PATENT DOCUMENTS 9,571,941 B2 2/2017 Heidenreich et al.
9,779,716 B2 10/2017 Gadonniex et al.
10,657,950 B2 5/2020 Hua et al.
2011/0069852 A1* 3/2011 Arndt ..................... H04R 25/48 381/328
2012/0008808 A1* 1/2012 Saltykov ................ H04R 25/48 381/317
2015/0334493 A1* 11/2015 Burns .................. H04R 25/552 381/23.1
2020/0020313 A1* 1/2020 Hua ..................... H04R 1/1016
2023/0136161 A1* 5/2023 Jin .................... G10K 11/17854 381/71.1
2023/0421971 A1* 12/2023 Rasmussen ...... G10K 11/17861

* cited by examiner

*Primary Examiner* — Angelica M McKinney

(57) ABSTRACT

An ear-worn hearing device with occlusion reduction is disclosed. The hearing device includes a signal processor configured to generate an anti-occlusion signal based on a feedforward signal from a vibration sensor located to detect tissue-propagated vibration within the user's at least partially occluded ear canal. Optionally, the anti-occlusion signal can also be based on a feedback signal from a microphone located to detect sound within the at least partially occluded ear canal. Unwanted vibrations detected by the vibration sensor can optionally be removed from the anti-occlusion signal based on filtering the anti-occlusion signal.

20 Claims, 6 Drawing Sheets

EAR-WORN HEARING DEVICE WITH ACTIVE OCCLUSION REDUCTION

FIELD OF THE DISCLOSURE

The present disclosure relates generally to ear-worn hearing devices and more particularly to ear-worn hearing devices with active occlusion reduction and electrical circuits therefor.

BACKGROUND

Ear-worn hearing devices that form a seal with a user's ear (also referred to as "closed-fit hearing devices") can obstruct, or occlude, the inner ear. The obstruction produces an occlusion effect perceived as magnification of the user's own voice and other sounds originating in and near the user's mouth. The effect is characterized by a pressure increase within the occluded ear canal predominately at frequencies below 2 kHz. The effect is also perceptible in hearing devices that do not form a complete seal. The occlusion effect can be a distraction during conversation and when eating.

Traditional approaches to meaningful occlusion reduction produce undesirable audio side-effects. For example, an acoustic vent into an otherwise occluded ear canal tends to degrade low frequency acoustic performance. Thus a vent is undesirable for listening to music and other audio content. Prior art active noise control (ANC) circuits can provide limited occlusion reduction. Such ANC circuits generate an anti-noise signal based on a feedback signal from a microphone located in the ear-canal and from a feedforward signal from a microphone located outside the ear. FIG. 9 illustrates noise reduction of a prior art ANC circuit based on feedforward and feedback microphone signals. The hatched area shows that the feedforward microphone signal augments the noise reduction provided by the feedback microphone signal. The feedback microphone can provide limited occlusion reduction, but the feedforward microphone cannot reduce the occlusion effect. Thus, there is an ongoing need to address the occlusion effect in ear-worn hearing devices.

BRIEF DESCRIPTION OF THE DRAWINGS

The objects, features and advantages of the present disclosure will become more fully apparent upon consideration of the following detailed description and appended claims in conjunction with the accompanying drawings. The drawings depict only representative embodiments and are not considered to limit the scope of the disclosure.

Those of ordinary skill in the art will appreciate that the figures are illustrated for simplicity and clarity and therefore may not be drawn to scale and may not include well-known features, that the order of occurrence of actions or steps may be different than the order described, that the order of occurrence of such actions or steps may be performed concurrently unless a specific order is required as apparent from the description, and that the terms and expressions used herein have meanings understood by those of ordinary skill in the art except where a different meaning is specifically attributed to them.

DETAILED DESCRIPTION

The disclosure relates generally to ear-worn hearing devices and more particularly to ear-worn hearing devices with vibration sensor-based active occlusion reduction, electrical circuits and methods therefor. Representative hearing devices include but are not limited to earphones, ear buds, in-the-ear (ITE) devices, completely-in-the-canal (CIC) devices, and receiver-in-canal (RIC) devices coupled to a behind-the-ear (BTE) unit, among other.

Figure 1:
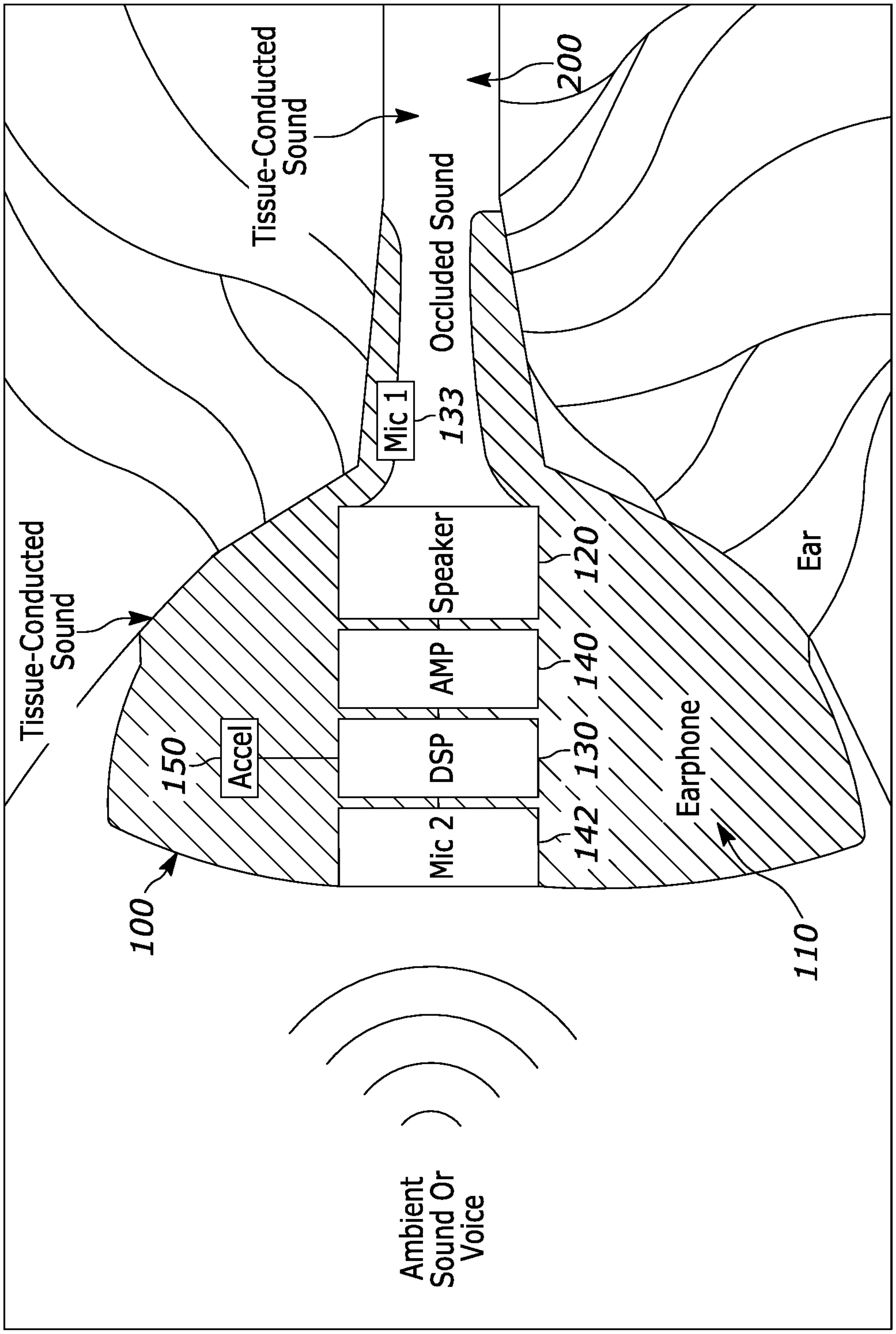
FIG. 1 is an ear-worn hearing device situated in or on a user's ear.

The hearing device generally comprises a housing having a portion configured to at least partially occlude or obstruct a user's ear canal when the hearing device is worn by the user. In FIG. 1, an ear-worn hearing device 100 comprises a housing with an integral housing portion 110 that at least partially occludes or obstructs the ear canal 200 when worn. Alternatively, the housing portion at least partially obstructing the ear canal can be an ear-dome or other structure removably fastened to the hearing device. In receiver-in-canal (RIC) hearing devices, the housing can be an integral part of the speaker (e.g., a balanced armature receiver housing) and the housing portion that at least partially obstructs the ear-canal can be an ear-dome coupled to a nozzle of the speaker or to a nozzle of a housing in which the speaker is at least partially contained. The occlusion produces an effect that is perceived as magnification of the user's voice and other sounds originating in and near the mouth. Ear-worn hearing devices susceptible to occlusion can be configured for wear over, on or at least partially in the user's ear or ear canal.

In FIG. 1, a sound-producing transducer (also referred to herein generally as a "speaker") 120 is disposed at least partially in the housing and located to emit sound into the user's ear when the hearing device is worn by the user. The speaker can be implemented as one or more balanced armature receivers or dynamic speakers, or a combination of balanced armature receivers and dynamic speakers. The hearing device also comprises a signal processor 130 configured to generate an output signal provided to a driver circuit, for example, an amplifier 140, that provides a drive signal to the speaker. The processor can be efficiently implemented as a digital signal processor.

Figure 2:
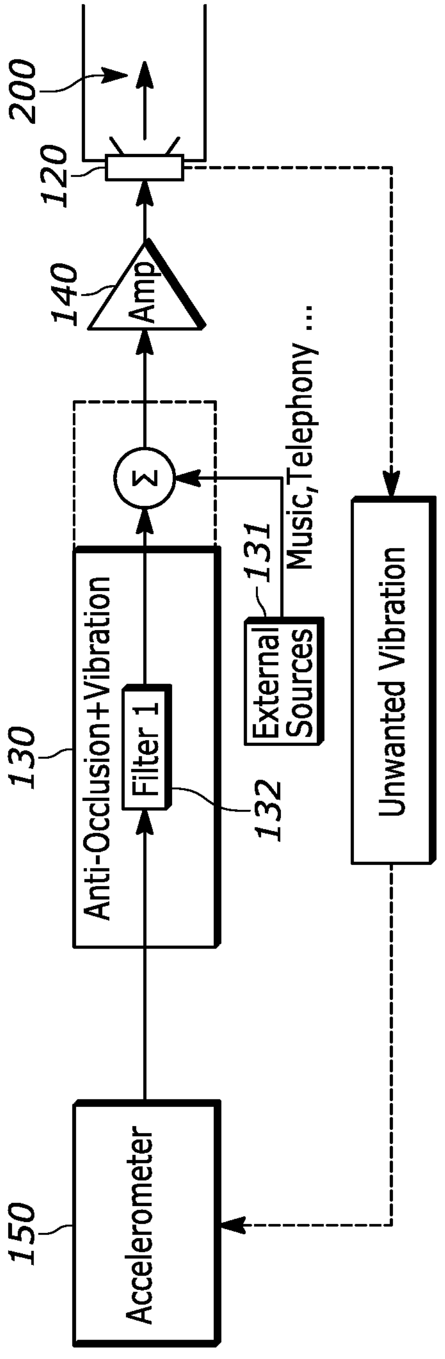
FIG. 2 is a schematic diagram of an ear-worn hearing device with feedforward vibration sensor-based occlusion reduction.

In FIG. 1, the hearing device 100 also comprises an accelerometer (also referred to herein to as a "vibration sensor") 150 located to detect tissue-propagated vibration when the hearing device at least partially occludes the user's ear canal. The vibration sensor can be integrated with the housing, a nozzle or other portion of the hearing device. The vibration sensor is coupled to the signal processor and provides a feedforward signal thereto based on tissue-propagated vibration detected by the vibration sensor. In FIG. 2, the processor 130 is configured to generate an anti-occlusion signal based on the feedforward signal from the vibration sensor 150. Ideally, the anti-occlusion signal has the same amplitude and opposite phase of the signal producing the occlusion effect. As a practical matter, the anti-occlusion signal has substantially the same amplitude and opposite phase of the signal to be canceled. The effectiveness of the occlusion reduction will be reduced with increasing deviation from the ideal. The anti-occlusion signal is provided to the speaker 120 via the amplifier 140, wherein the occlusion effect perceived by the user is reduced.

In FIG. 2, the output signal comprising the anti-occlusion signal can also include, or be combined with, one or more signals from external sources 131. Such external sources can include music and telephony signals, among others. The processor can combine the signals from external sources with the output signal, or the combination can be performed downstream of the processor and upstream of the driver circuit (e.g., amp 140).

The vibration sensor is generally capable of effectively detecting tissue-propagated vibrations between 300 Hz and 3 kHz. In one representative implementation, effective occlusion reduction can be achieved by detecting tissue-propagated vibrations between 500 Hz and 2 kHz. In some applications however it may be desirable to compensate for tissue-propagated vibrations below 300 Hz.

The processor generates the anti-occlusion signal by filtering the feedforward signal from the vibration sensor and inverting the phase of the filtered signal. In FIG. 2, the processor 130 comprises a first filter 132 configured to perform shelf, peak or notch functions, among other filter functions for this purpose. The first filter can be implemented as one or more filter components connected in parallel and/or in series. These filter components can be implemented as one or more digital infinite impulse response (IIR) filters or finite impulse response (FIR) filters, among others. In FIG. 5, the signal processor is configured to intermittently or continuously optimize performance of the first filter 132 by updating one or more filter coefficients using an optimization function or model based on a feedback signal from a first microphone 133. The first microphone is located to detect sound within the user's ear canal and can be integrated with the housing, nozzle or other portion of the hearing device. The adaptive anti-occlusion filter of FIG. 5 can be used in any of the occlusion reduction circuits of FIGS. 2-4, 6, 7 and 8.

Figure 3:
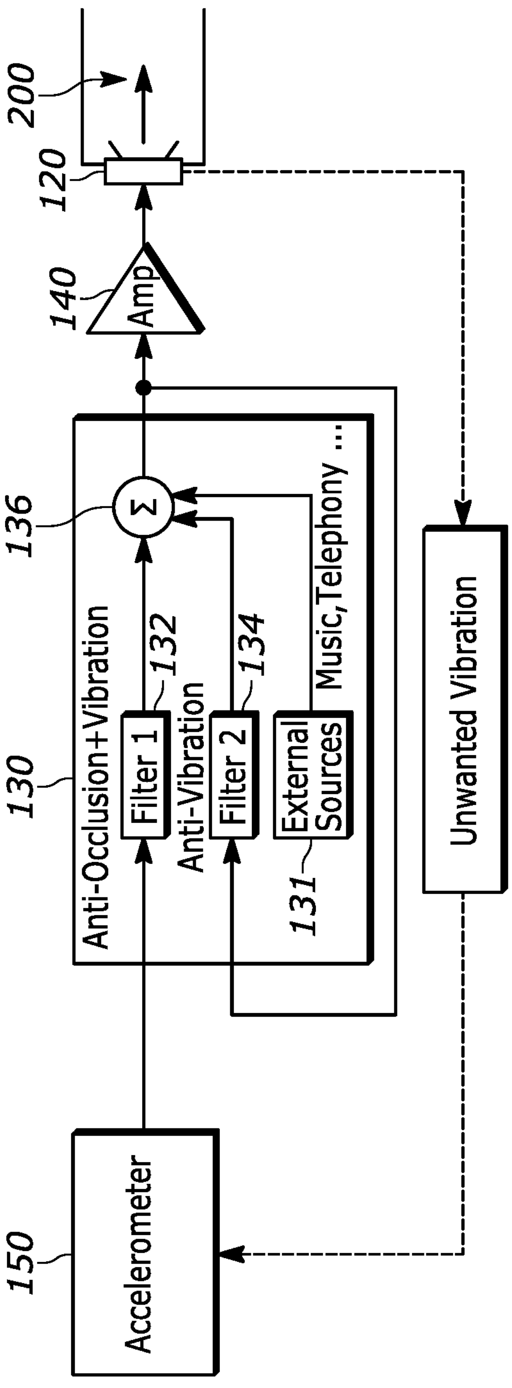
FIG. 3 is the schematic diagram of FIG. 2 supplemented with unwanted-vibration compensation.

The vibration sensor can also detect unwanted vibration. In FIGS. 2 and 3, the vibration sensor 150 detects unwanted vibration originating from the speaker 120 in the user's ear canal. Thus the feedforward signal from the vibration sensor can include an unwanted-vibration signal in addition to the tissue-propagated vibration signal, wherein the resulting anti-occlusion signal generated by the processor also includes the unwanted-vibration component. In some implementations, the unwanted-vibration component can be eliminated or reduced by subtracting an anti-vibration signal from the anti-occlusion signal upstream of the driver circuit. The anti-vibration signal can be generated by filtering the anti-occlusion signal.

Figure 4:
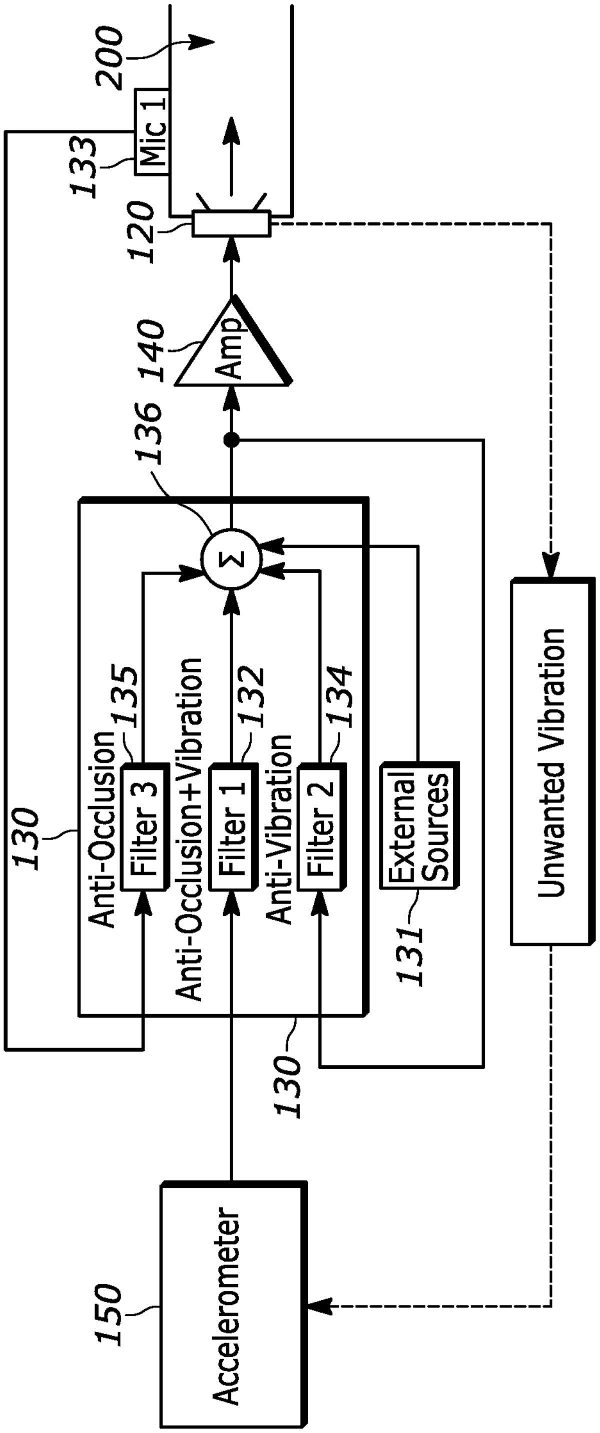
FIG. 4 is the schematic diagram of FIG. 3 supplemented with feedback microphone-based occlusion reduction.
Figure 5:
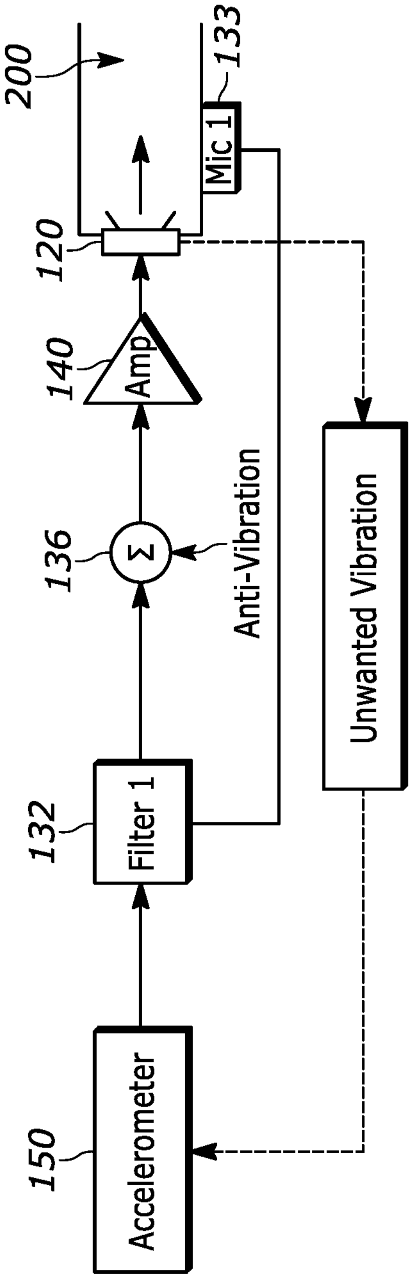
FIG. 5 is an adaptive filter for feedforward vibration signal-based occlusion reduction for use in any of the schematic diagrams of FIGS. 2-4, 6, 7 and 8.

In FIGS. 3 and 4, the processor 130 is configured to generate an anti-vibration signal based on the anti-occlusion signal fed back from the output of the summer 136. The anti-vibration signal has the same or substantially the same amplitude but opposite phase of the vibration component of the anti-occlusion signal. When combined at the summer, the unwanted-vibration component of the anti-occlusion signal is eliminated or at least partially reduced. The processor can generate the anti-vibration signal by filtering the anti-occlusion signal output from the summer with a second filter 134. The processor can implement the second filter as one or more digital filter components connected in parallel and/or in series. These filter components can be implemented as digital infinite impulse response (IIR) filters, among others, configured to perform shelf, peak or notch functions, among others as described herein.

Figure 6:
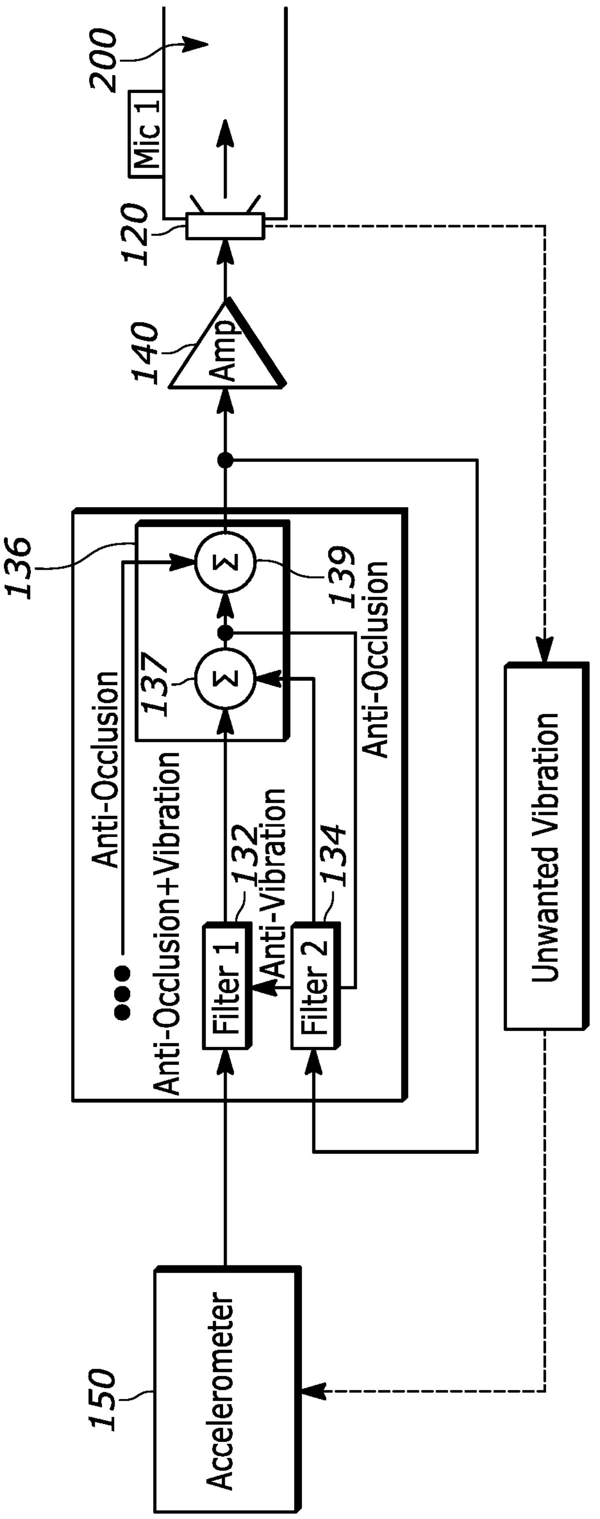
FIG. 6 is an adaptive filter for unwanted-vibration compensation in any of FIGS. 2-5, and 8.

In some implementations, shown in FIG. 6, the signal processor is configured to intermittently or continuously optimize performance of the second filter 134 by updating one or more filter coefficients using an optimization function or model based on a feedback signal from the outputs of the first and second filters 132 and 134. The summer 136 comprises a first summer 137 that combines the outputs of filters 132 and 134. The processor uses the feedback signal from the first summer 137 for adaptation of the second filter 134. The output of the first summer 137 can be provided to the amplifier 140, alone or in combination with signals from an external source as described herein. In implementations where the anti-occlusion signal is also based on the microphone feedback signal, described herein with reference to FIG. 4, the output of the first summer 137 is summed with the output of a third filter (filter 135 in FIG. 4) at a second summer 139 downstream of the first summer 137, as described further herein. The adaptive anti-vibration filter of FIG. 6 can be used in any of the occlusion reduction circuits of FIGS. 2-5 and 8.

In some implementations, the signal processor is configured to generate the anti-occlusion signal based on a feedback signal from the first microphone in addition to the feedforward signal from the vibration sensor, with or without the anti-vibration signal. In FIG. 4, the processor 130 is configured to generate the anti-occlusion signal by filtering the feedback signal from the first microphone 133 and inverting the phase of the filtered signal. The processor can implement the third filter as one or more digital filter components connected in parallel and/or in series. These filter components can be implemented as digital infinite impulse response (IIR) filters, among others, configured to perform shelf, peak or notch functions, among others as described herein. In FIG. 4, the filtered microphone feedback signal output from the third filter 135 is combined with the outputs of filters 132 and 134 at summer 136. The resulting anti-occlusion signal is thus based on the summation of the outputs of the filters 132 and 134, and optionally filter 135, and can constitute all or a portion of the output signal applied to amplifier 140 for driving the speaker 120. Signals from external sources 131 can also be combined with the anti-occlusion signal upstream of the amplifier 140 as described herein.

Figure 7:
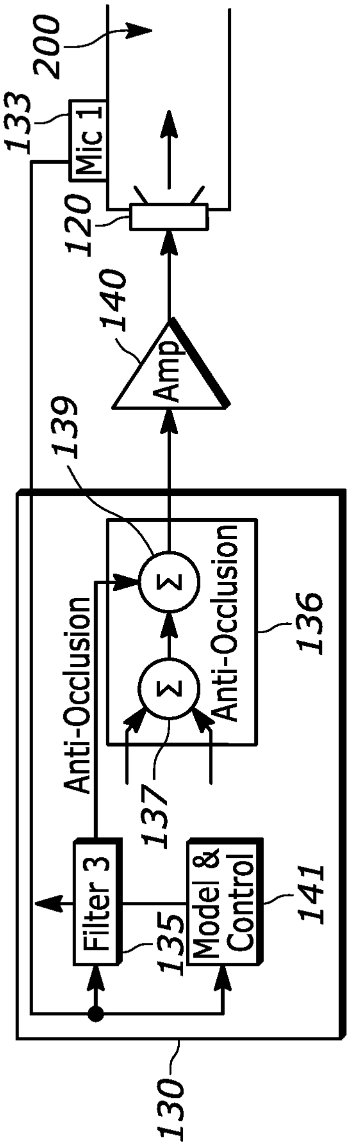
FIG. 7 is an adaptive filter for the feedback microphone-based occlusion reduction in any of FIGS. 4, 6 and 8.
Figure 8:
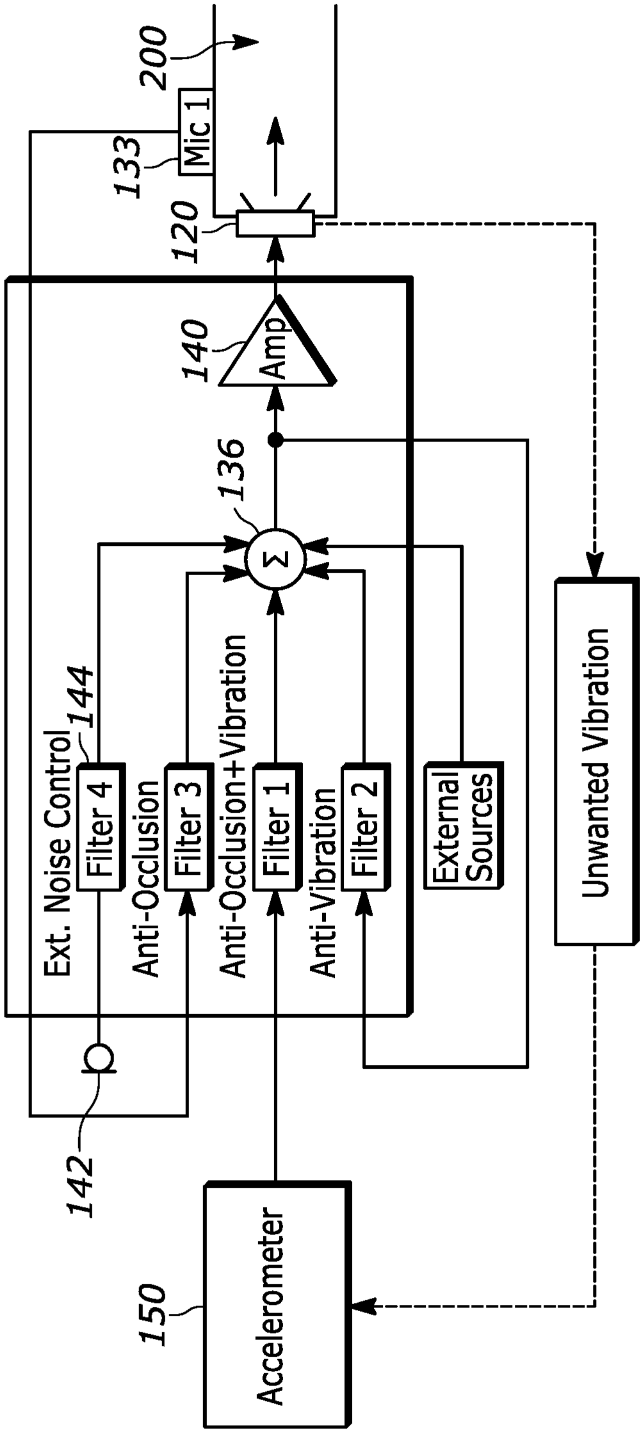
FIG. 8 is the diagram of FIG. 4 with ambient sound control.
Figure 9:
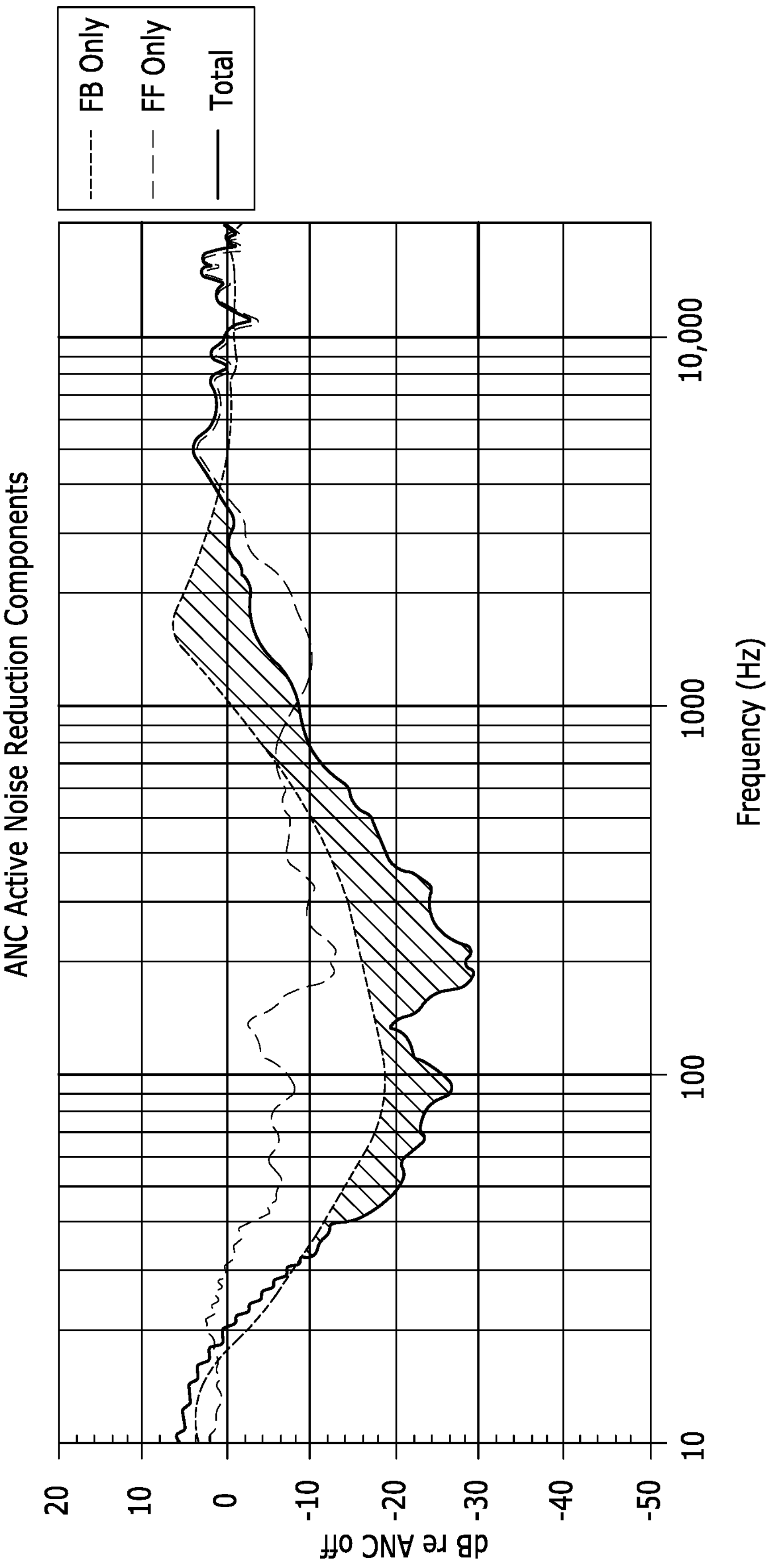
(Prior Art) FIG. 9
FIG. 9 illustrates prior art ANC versus frequency based on feedback and feed-ward microphone signals.

In some implementations, shown in FIG. 7, the signal processor is configured to intermittently or continuously optimize performance of the third filter 135 by updating one or more coefficients of the third filter using an optimization function or model 141 based on a feedback signal from the first microphone 133. A second summer 139 combines the anti-occlusion signal output from the third filter 135 with the anti-occlusion signal output from the first summer 137. The first summer 137 combines the outputs of the first and second filters 132 and 134 shown in FIG. 4. The second summer is coupled to the amplifier 140. Alternatively, the outputs of filters 132, 134 and 135 can be combined at the first summer 137 coupled to the amplifier, without the second summer 139, as shown in FIGS. 4 and 8. The anti-occlusion signal can also be combined with signals from external sources as described herein. The adaptive feedback microphone signal filter of FIG. 7 can be used in any of the occlusion reduction circuits of FIGS. 4, 6 and 8.

In some implementations, the ear-worn hearing device further comprises a second microphone located to detect sound outside the user's ear, wherein the signal processor is configured to generate an output signal based in part on a signal from the second microphone. In FIG. 8, the ear-worn hearing device further comprises a second microphone 142 located to detect sound outside the user's ear canal. The second microphone can be integrated with a housing worn in the ear (e.g., a RIC, CIC, ITE device) or with a BTE housing.

In one implementation, in FIGS. 1 and 8, the signal processor is configured to generate an anti-sound signal based on a signal from a second microphone 142 located to sense or detect sound or ambient signals outside the ear. In FIG. 8, the anti-sound signal can be generated by filtering the signal from the external microphone 142 with a fourth filter 144 configured to cancel unwanted sound (e.g., noise) detected by the second microphone. The fourth filter can be implemented as one or more filter components connected in parallel and/or in series. These filter components can be implemented as digital infinite impulse response (IIR) filters or finite impulse response (FIR) filters, among others, configured to perform shelf, peak or notch functions, among others as described. In some implementations, the anti-sound signal can be generated based on the feedback signal from the first microphone 133 in addition to the signal from the external microphone 142 for improved noise cancellation. Thus configured, unwanted sound can be reduced within the user's ear canal when the speaker is driven by a drive signal based on the anti-sound signal.

In another implementation, in FIG. 8, the signal processor can be configured to pass the feedforward signal from the second microphone 142 to the speaker. In this implementation, the fourth filter 144 can be configured to pass a desired portion of sound detected by the second microphone. For example, the filter can be configured to reduce noise in the signal while preserving the fidelity of certain sounds. Thus configured the speaker reproduces sound detected by the second microphone when the speaker is driven by the drive signal based on the feedforward signal from the second microphone.

In some implementations, the processor is also configured to calibrate or adapt one or more of the filters for optimal performance based on user input. Such calibration can be performed by configuring one or more coefficients of the one or more filters based on user-generated tissue-vibrations (e.g., by speaking words or nonce sounds). Calibration can occur upon first inserting or enabling the ear-worn hearing device. Calibration can also be performed while the hearing device is being worn. For example, the hearing device can reinitiate calibration in response to the detection of a vibration or acceleration event (e.g., resulting from physical activity) indicative of a possible repositioning of the hearing device in the user's ear. In some implementations, upon enabling the hearing device, the hearing device or host device prompts the user to generate tissue-vibrations. Calibration can uniquely configure the filters for variations in physical anatomy among different users and for variations in the fit or seal of the hearing device in the user's ear.

While the disclosure and what is presently considered to be the best mode thereof has been described in a manner establishing possession and enabling those of ordinary skill in the art to make and use the same, it will be understood and appreciated that there are many equivalents to the representative embodiments described herein and that myriad modifications and variations may be made thereto without departing from the scope and spirit of the invention, which is to be limited not by the embodiments described but by the appended claims and their equivalents.

What is claimed is:

1. An ear-worn hearing device comprising:

a housing portion configured to at least partially obstructs a user's ear canal when the hearing device is worn by the user;

a speaker at least partially disposed in the housing portion and located to emit sound into the user's ear when the hearing device is worn by the user;

a vibration sensor located to detect tissue-propagated vibration within an at least partially obstructed ear canal;

a signal processor coupled to the vibration sensor and configured to generate an anti-occlusion signal based on a feedforward signal from the vibration sensor;

a driver circuit coupled to and configured to drive the speaker with a drive signal comprising the anti-occlusion signal.

2. The ear-worn hearing device of claim 1, the signal processor comprising a first filter, wherein the anti-occlusion signal is generated based on filtering the feedforward signal from the vibration sensor with the first filter.

3. The ear-worn hearing device of claim 2 further comprising a first microphone located to detect sound within the at least partially obstructed ear canal, the signal processor comprising a third filter, wherein the anti-occlusion signal is generated based on filtering a feedback signal from the first microphone with the third filter.

4. The ear-worn hearing device of claim 3, wherein the signal processor is configured to update a coefficient of the first filter based on the feedback signal from the first microphone.

5. The ear-worn hearing device of claim 3, wherein the signal processor is configured to update a coefficient of the third filter based on the feedback signal from the first microphone.

6. The ear-worn hearing device of claim 2, wherein the signal processor is configured to update a coefficient of the first filter based on user-generated tissue-propagated vibration in response to a prompt.

7. The ear-worn hearing device of claim 1, the signal processor comprising a second filter, wherein the signal processor is configured to reduce an unwanted-vibration component of the anti-occlusion signal based on filtering the anti-occlusion signal with the second filter.

8. The ear-worn hearing device of claim 1 further comprising a first microphone located to detect sound within the at least partially obstructed ear canal, the signal processor comprising a third filter, wherein the anti-occlusion signal is generated based on filtering a feedback signal from the first microphone with the third filter.

9. The ear-worn hearing device of claim 1, wherein the vibration sensor is capable of detecting tissue-propagated vibrations at 300 Hz or higher.

10. The ear-worn hearing device of claim 1, wherein the vibration sensor is capable of detecting tissue-propagated vibrations below 3 kHz.

11. The ear-worn hearing device of claim 1, wherein the vibration sensor is capable of detecting tissue-propagated vibrations between 500 Hz and 2 kHz.

12. The ear-worn hearing device of claim 1, further comprising a second microphone integrated with the housing portion and located to detect sound outside the user's ear canal, the signal processor configured to generate an anti-sound signal, representing unwanted sound, based on a signal from the second microphone, wherein unwanted sound is reduced within the user's ear canal when the speaker is driven by the drive signal.

13. The ear-worn hearing device of claim 12, further comprising a second microphone integrated with the housing portion and located to detect sound outside the user's ear canal, the signal processor configured to generate an audio signal based on the signal from the second microphone, wherein the speaker reproduces audio detected by the second microphone when the speaker is driven by the drive signal.

14. An ear-worn hearing device comprising:

a housing portion configured to at least partially occlude a user's ear canal when the hearing device is worn by the user;

a speaker at least partially disposed in the housing portion and located to emit sound into the user's ear when the hearing device is worn by the user;

a vibration sensor located to detect tissue-propagated vibration within an at least partially occluded ear canal;

a first microphone located to detect sound within the at least partially occluded ear canal;

a signal processor coupled to the vibration sensor and to the first microphone, the signal processor configured to generate an anti-occlusion signal based on a feedforward signal from the vibration sensor and based on a feedback signal from the first microphone;

a driver circuit coupled to and configured to drive the speaker with a drive signal comprising the anti-occlusion signal.

15. The ear-worn hearing device of claim 14, the signal processor comprising a first filter coupled to the vibration sensor, wherein the anti-occlusion signal is generated based on filtering the feedforward signal from the vibration sensor with the first filter;

a second filter coupled to the first microphone, wherein the signal processor is configured to reduce an unwanted-vibration component of the anti-occlusion signal based on filtering the anti-occlusion signal with the second filter;

a third filter coupled to the first microphone, wherein the anti-occlusion signal is generated based on filtering the feedback signal from the first microphone with the third filter.

16. The ear-worn hearing device of claim 15, wherein the signal processor is configured to update a coefficient of the first filter based on the feedback signal from the first microphone.

17. The ear-worn hearing device of claim 15, wherein the signal processor is configured to update a coefficient of the third filter based on the feedback signal from the first microphone.

18. The ear-worn hearing device of claim 15, wherein the signal processor is configured to update a coefficient of the first filter based on user-generated tissue-propagated vibration in response to a prompt.

19. The ear-worn hearing device of claim 14, wherein the vibration sensor detects tissue-propagated vibrations between 500 Hz and 2 kHz.

20. The ear-worn hearing device of claim 14, further comprising a second microphone integrated with the housing portion and located to detect sound outside the user's ear canal, the signal processor configured to generate an anti-sound signal, representing unwanted sound, based on a signal from the second microphone, wherein unwanted sound is reduced within the user's ear canal when the speaker is driven by the drive signal.

* * * * *